(12) United States Patent
Avermeyer et al.

(10) Patent No.: US 10,894,350 B2
(45) Date of Patent: Jan. 19, 2021

(54) EXTRUSION DEVICE AND EXTRUSION METHOD THAT PRODUCES A PLASTIC FILM

(71) Applicant: Windmöller & Hölscher KG, Lengerich (DE)

(72) Inventors: Ansgar Avermeyer, Georgsmarienhütte (DE); Tobias Kulgemeyer, Hagen a. T. W. (DE); Markus Bussmann, Essen (DE); Martin Backmann, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 148 days.

(21) Appl. No.: 15/579,729

(22) PCT Filed: May 10, 2016

(86) PCT No.: PCT/EP2016/060444
§ 371 (c)(1),
(2) Date: Dec. 5, 2017

(87) PCT Pub. No.: WO2016/198222
PCT Pub. Date: Dec. 15, 2016

(65) Prior Publication Data
US 2018/0162034 A1  Jun. 14, 2018

(30) Foreign Application Priority Data
Jun. 8, 2015 (DE) .................. 10 2015 108 975

(51) Int. Cl.
*B29C 48/25* (2019.01)
*B29C 48/08* (2019.01)
(Continued)

(52) U.S. Cl.
CPC .......... *B29C 48/2563* (2019.02); *B29C 48/08* (2019.02); *B29C 48/10* (2019.02);
(Continued)

(58) Field of Classification Search
CPC . B29C 48/2563; B29C 48/267; B29C 48/271; B29C 48/2692; B29C 48/277; B29C 48/297
See application file for complete search history.

(56) References Cited

U.S. PATENT DOCUMENTS 4,955,550 A * 9/1990 Satake .................... B29B 7/603
                                                             241/101.4
6,024,141 A * 2/2000 Wegman ................... B65B 1/12
                                                             141/129
(Continued)

FOREIGN PATENT DOCUMENTS

DE         202004015743 U1 *  2/2006  ............. B29C 48/04
DE    20 2004 015 743 U1      3/2006
(Continued)

OTHER PUBLICATIONS

First Office Action dated Jul. 31, 2019 of counterpart Chinese Application No. 201680033082.7, along with an English translation.
(Continued)

*Primary Examiner* — Jacob T Minskey
*Assistant Examiner* — Virak Nguon
(74) *Attorney, Agent, or Firm* — DLA Piper LLP (US)

(57) ABSTRACT

An extrusion device that produces plastic film includes at least two feed units that feed feedstock to an extruder, wherein each feed unit has at least one discharge opening including a discharge closure to open and close the discharge opening, and a container interface that reversibly fastens a
(Continued)

discharge container that accommodates feedstock discharged from the respective feed unit.

10 Claims, 7 Drawing Sheets

(51) Int. Cl.
    *B29C 48/10*     (2019.01)
    *B29C 48/27*     (2019.01)
    *B29C 48/275*     (2019.01)
    *B29C 48/285*     (2019.01)
    *B29C 48/92*     (2019.01)
    *B29B 7/60*     (2006.01)

(52) U.S. Cl.
    CPC ...... *B29C 48/2567* (2019.02); *B29C 48/2692* (2019.02); *B29C 48/271* (2019.02); *B29C 48/277* (2019.02); *B29C 48/286* (2019.02); *B29B 7/603* (2013.01); *B29C 48/92* (2019.02); *B29C 2948/9298* (2019.02); *B29C 2948/92333* (2019.02); *Y02P 70/10* (2015.11)

(56) References Cited

U.S. PATENT DOCUMENTS

| 7,665,490 | B1* | 2/2010 | Elliott | B29C 48/143 |
| | | | | 141/284 |
| 2010/0012220 | A1* | 1/2010 | Waldron | B65B 1/28 |
| | | | | 141/7 |
| 2015/0298841 | A1* | 10/2015 | Ensor | B65B 43/465 |
| | | | | 53/475 |
| 2016/0185522 | A1* | 6/2016 | Herman | B60P 1/04 |
| | | | | 414/332 |
| 2018/0001514 | A1* | 1/2018 | Tojo | B29B 7/845 |

FOREIGN PATENT DOCUMENTS

| EP | 0 318 170 A2 | 5/1989 |
| JP | 57-178734 A | 11/1982 |
| JP | 63-163922 | 10/1988 |
| JP | 05-269822 A | 10/1993 |
| JP | 06-39835 A | 2/1994 |
| JP | 08-336880 A | 12/1996 |
| JP | 11-254499 A | 9/1999 |

OTHER PUBLICATIONS

International Search Report dated Jul. 18, 2016, of corresponding PCT/EP2016/060444, along with a summary in English.

Rule 66 PCT Communication dated May 16, 2017, of corresponding PCT/EP2016/060444, along with a summary in English.

International Preliminary Report on Patentability dated Aug. 17, 2017, of corresponding PCT/EP2016/060444, along with English translation dated Dec. 14, 2017.

Second Office Action dated Mar. 31, 2020, of counterpart Chinese Application No. 201680033082.7, along with an English translation.

European Office Action dated Jul. 7, 2020, of counterpart European Application No. 16722174.6, along with a Summary of Office Action in English.

* cited by examiner

EXTRUSION DEVICE AND EXTRUSION METHOD THAT PRODUCES A PLASTIC FILM

TECHNICAL FIELD

This disclosure relates to an extrusion device that produces a plastic film as well as to a method of discharging a feedstock from a feed unit of such an extrusion device.

BACKGROUND

Extrusion devices used to produce plastic films are known. For this purpose, a large variety of formulas for a large variety of products are typically processed one behind the other sequentially on an extrusion device. Material thus needs to be changed between the individual formulas. This means that feedstock needs to be discharged from feed units of the extrusion device so that subsequent materials can be filled into feed units as arriving feedstock.

In known extrusion devices, it is disadvantageous that the discharge typically takes place in a purely manual manner. A catch bag or a catch container is thus typically held underneath a corresponding feed unit and the residual feedstock contained therein is conveyed out into the corresponding catch container. As a result, a machine operator needs to hold the catch container in the desired position during the entire time of the discharge process and needs to monitor the discharge process. This further has the result that the machine operator can always only process a single feed unit with regard to changing the material. A purely sequential execution of changing the material, however, leads to a very high expenditure of time. It must in particular be considered thereby that such extrusion devices are used in particular for multi-layer films so that two, three or up to seven extruders can be used as well, which each can have a plurality of feed units and in particular up to seven or eight feed units. Due to the fact that a plurality of feed units always needs to be loaded with new materials when changing the material, this leads to a very high expenditure of time and also to physical strain on the machine operator.

It could therefore be helpful to at least partially eliminate the above-described disadvantages and improve and/or to facilitate the discharge of feedstock in a cost-efficient and simple manner when changing the material.

SUMMARY

We provide an extrusion device that produces plastic film including at least two feed units that feed feedstock to an extruder, wherein each feed unit has at least one discharge opening including a discharge closure to open and close the discharge opening, and a container interface that reversibly fastens a discharge container that accommodates feedstock discharged from the respective feed unit.

We also provide a method of discharging a feedstock from the feed units of the extrusion device that produces plastic film including at least two feed units that feed feedstock to an extruder, wherein each feed unit has at least one discharge opening including a discharge closure to open and close the discharge opening, and a container interface that reversibly fastens a discharge container that accommodates feedstock discharged from the respective feed unit. Including identifying a changing request for the discharge of the feedstock, fastening a discharge container to the fastening interface of the discharge opening of a feed unit, opening the discharge closure of the discharge opening with the fastened discharge container, and repeating the two above steps for at least one further feed unit.

LIST OF REFERENCE NUMERALS 10 extrusion device
20 feed unit
22 weighing funnel
23 funnel opening
24 down pipe
26 feed container
28 dosing screw
30 extruder
40 control device
42 filling level sensor
50 discharge opening
52 discharge closure
54 container interface
56 sensor device
60 discharge container
70 return device
DT free cross section of the funnel opening
DA free cross section of the discharge opening
DD free cross section of the dosing screw
feedstock
BF operating filling level
WF changing filling level
F filling level

DETAILED DESCRIPTION

Features and details described in connection with our extrusion device shall thereby also apply in connection with our method and in each case vice versa so that, with regard to the disclosure, reference is or can mutually always be made, respectively, to the individual aspects.

Our extrusion device produces a plastic film. For this, the extrusion device has at least two feed units that feed feedstock to an extruder. Each feed unit is thereby equipped with at least one discharge opening comprising a discharge closure to open and close the discharge opening. The corresponding discharge opening is furthermore equipped with a container interface to reversibly fasten a discharge container that accommodates feedstock, which is discharged from the respective feed unit.

Our extrusion device is thus equipped to discharge material from the feed unit in a particularly simple manner and in particular independently of a machine operator. The discharge opening can thereby in particular be an aperture or a hole on the underside of the feed unit. A discharge closure can be a flap or another mechanical device, for example, that can provide a closing or opening functionality, respectively. It is thereby irrelevant whether opening and closing of the discharge opening is carried out automatically or manually by the discharge closure. It is preferred when the discharge closure has an automatic adjusting option, for example, with the help of a small drive device.

If it is desired to change the material in an extrusion device, the material is typically changed at two or more feed units. In this example, reference shall be made to a particularly simple structure comprising two or more feed units. When the material is changed, a discharge container is fastened to each feed unit at the corresponding container interface of each discharge opening with the help of the machine operator. As soon as this has taken place, the discharge closure of the respective discharge opening can be opened with a manual or automated operation so that the material can be introduced from the feed unit into the discharge container. This introduction can be carried out by gravity conveyance as well as by active support. It is significant that the discharge container automatically remains in the desired discharge position during discharge of the feedstock from the feed unit by providing the container interface. The machine operator thus has the freedom to go to the next feed unit and carry out the same steps there, thus to fasten a discharge container to the corresponding container interface, and to subsequently bring the discharge closure into an open position. As a result, the discharge process of the feedstock into the discharge container can take place in parallel at two or more feed units.

The above-discussed parallel operation provides for a very large time savings. In particular, in complex structures of film production machines, in which a plurality of extrusion devices can be used, a plurality of feed units can be processed simultaneously with respect to changing the material. A machine operator can thus move from feed unit to feed unit and accordingly fasten discharge containers to the corresponding container interfaces. Subsequently, opening of the discharge closures can be initiated either manually or in an automated manner by a sensor system so that the discharge process is carried out at every feed unit at which a discharge container is already arranged. Due to the fact that the discharge process can typically take a very long time, in particular within the range of up to several minutes, depending on the residual volume of feedstock in the feed unit, a strong parallelization of the operating steps and in particular of the discharge processes can be carried out in this way. As soon as a discharge process has been concluded for a feed unit, thus when all residual feedstock has been conveyed out of the interior of the feed unit, the discharge opening can be closed again by the discharge closure. The outputting and thus completion of the first part of the change request is concluded at that point in time so that a refilling with a subsequent material of a subsequent formula can now be carried out.

In principle, it is irrelevant whether the discharge containers are arranged at the respective container interface at the time the material is changed, or whether this is already provided at an earlier point in time. The machine operator, for example, can thus empty the filled discharge containers again immediately after changing the material, and can fasten the empty discharge containers in the desired positions again. As a result, changing the material can be automated even further because it is no longer necessary to wait until a machine operator has fastened the respective discharge container in the desired position at the container interface to discharge the feedstock from the feed unit.

In addition to the parallelism of the processes and the associated significant time advantage, a relief of the physical strain on the machine operator is achieved as well. It is thus no longer necessary to use one's own physical strength to hold a corresponding container underneath a feed unit until the discharge process has been completed, but the force absorption in response to introducing the discharged feedstock does in fact take over the corresponding container interface to which the discharge container is fastened.

It may be advantageous when, in our extrusion device, in addition to fastening the discharge container, the fastening interface fastens a return device for returning feedstock into a storage. Such a storage can be a silo, for example, arranged locally distanced from the extrusion device. For a corresponding transportation of the feedstock, provision can, for example, be made for a suction conveyance. It is thus possible, in particular with expensive feedstock or large quantities of feedstock to be discharged from the feed unit, to not catch it in a separate discharge container, but to ensure a return into a storage in this special case. This leads to a significant reduction of waste while changing the material. It is also possible thereby for the fastening interface to have the same fastening surfaces for a corresponding return unit as well as for the discharge container. The fastening interface, however, can also have different fastening surfaces so that different geometric orientations and dimensions of the return device can be capable of being considered for the corresponding fastening independent of the corresponding geometric orientations and dimensions of the discharge container.

It is a further advantage in our extrusion device when the discharge opening, the discharge closure and/or the container interface have a sensor device that identifies occupancy of the fastening interface. In the simplest case, such a sensor device can be a control button manually operated by the machine operator as soon as the discharge container is arranged at the fastening interface. However, the sensor device preferably has an automatic mode so that occupancy of the fastening interface by the discharge container can be identified with the help of an occupancy sensor in an automated manner. The discharge can thereby preferably start or be released, respectively only as a function of a corresponding sensor signal. For example, an automatic opening control of the discharge closure can thus be provided, which only brings the discharge closure into the open position when a corresponding release signal from the corresponding sensor device reports the positive occupancy of the fastening interface. This sensor device can thus be embodied qualitatively as well as quantitatively. It is thus possible that not only the purely actual occupancy of the fastening interface is identified with the help of the sensor device, but also the type or the correctness, respectively, of the discharge container used in this container interface. This leads to a further increase in safety. Contamination by an unwanted free discharge can also be prevented in this position. Last but not least, it is also possible that an existing loading of the discharge container and thus a corresponding filling level can be identified in a qualitative or also quantitative manner, for example, in the form of a weighing sensor. This prevents an unwanted spilling of a partially residually filled discharge container, which could still be in the occupancy of a fastening interface.

It is also advantageous when, in our extrusion device, the discharge opening comprises a gravity conveyance when discharging the feedstock. This means that the discharge opening is preferably located at the lowermost section of the entire feed unit or forms the lower end of the feed unit, respectively. Funnel-shaped surfaces preferably point towards the discharge opening so that the gravity conveyance provides for a guided outputting or a guided discharging, respectively, of the residual feedstock from the feed unit. In addition to a gravity conveyance, an active conveyance is possible, for example, a blowing out, a pressing out, a mechanical discharging or also draining. A pure gravity conveyance, however, has the advantage that the complexity of the overall system is reduced significantly by a reduction of the components.

It is a further advantage when in our extrusion device, the feed unit has a dosing screw, wherein a the feedstock is supplied to the dosing screw from a funnel opening of a weighing funnel, and the free cross section of the funnel opening to the free cross section of the discharge opening has a ratio of more than 1:1. Provision is in particular made for a ratio of 1:1 to 0.1:1. This means that the discharge opening is larger, in particular significantly larger than the funnel opening. As an upper boundary, the funnel opening is thereby equal to or substantially equal to the free flow cross section of the discharge opening with regard to the free flow cross section. In round outlets, the free cross section is in particular characterized by the corresponding diameter. In particular, in weighing funnels, however, flow-minimizing installations, for example, funnel inserts are possible in the funnel opening so that the free flow cross section can also be significantly more complex. This correlation of the ratio makes it possible for the discharge of the feedstock from the discharge opening to not represent a limiting factor, but that a maximum opening does in fact release a corresponding maximum discharge. Unwanted dust or even bridging can be prevented effectively in the area of the dosing screw and the discharge is accelerated.

It may be a further advantage when, in our extrusion device, the feed unit has a dosing screw and the free flow cross section of the discharge opening is larger than or equal to the free flow cross section of dosing screw. This means that no limiting factor is provided to the dosing screw through the discharge opening, even in response to a cleaning process. During the output, the dosing screw can thus be rotated in reverse so that feedstock located inside the dosing screw is conveyed backwards out of the dosing screw and can also be conveyed out of the discharge opening. An unwanted accumulation of the feedstock is also avoided effectively here in response to the discharge from the dosing screw.

It is further advantageous when, in our extrusion device, a discharge container comprising a discharge volume that accommodates feedstock is reversibly fastened to the container interface, which discharge volume has a ratio of 1:1.2 to 1:5 with a changing filling level in the feed unit. A range of the ratio of 1:1.2 to 1:1.5 is preferred. This means that the discharge container underneath the discharge opening is sufficiently large, but not too large. The above ratios have turned out to be a specific correlation of the individual volumes. In particular, a ratio of 1:1.2 to 1:1.5 is thus advantageous because the discharge container is quasi 20% to 50% larger than the remaining volume of feedstock located inside the feed unit. This is in particular sensible because a filling level will form inside the discharge container in response to the discharge of the feedstock from the feed unit so that the overall volume of the discharge container during the discharge is not available completely for the feedstock. A residual volume, which is no longer available as hollow volume for a further filling, does in fact remain at the upper end on the side of the filling cone. For such a case, the increased provision of the discharge container prevents spilling of the discharge container and in particular also crushing of feedstock in the interior of the feed unit.

It is also advantageous when in our extrusion device the discharge opening and/or the discharge closure is adjustable with regard to the discharge speed. Intermediate positions for the discharge closure are thus possible in addition to a pure open position and a pure closed position so that different discharge speeds can be reached according to the principle of a variable valve. This is advantageous in particular with regard to a corresponding dust formation in granules that are particularly fine or susceptible to dust, as feedstock, to avoid a risk of explosion or simply only unwanted contamination in the surrounding area of the discharge container.

We also provide a method for the discharge of a feedstock from a feed unit into an extrusion device comprising the following steps:
    identifying a changing request for the discharge of the feedstock,
    fastening a discharge container to the fastening interface of the discharge opening of a feed unit,
    opening the discharge closure of the discharge opening with the fastened discharge container, and
    repeating the two above steps for at least one further feed unit.

The above steps are repeated in particular for all feed units, preferably all feed units, for which an actual material change is to be carried out. Unused feed units without material change can remain unaffected by this method in this way. Such a method is associated with the same advantageous, as they have been discussed in detail with regard to our extrusion device.

Further advantages, features and details follow from the description below, in which examples are described in detail by referring to the drawings. The features in the description can thereby be significant in each case alone or in any combination.

FIGS. 1 to 5 show, schematically, an example of an extrusion device 10 equipped with two feed units 20. Both feed units 20 have a storage container 26 that leads the feedstock E to the bottom into a down pipe 24. A weighing funnel 22 from which the feedstock E can be supplied to an extruder 30 with the help of a dosing screw 28 is located to closed off on the bottom.

Figure 1:
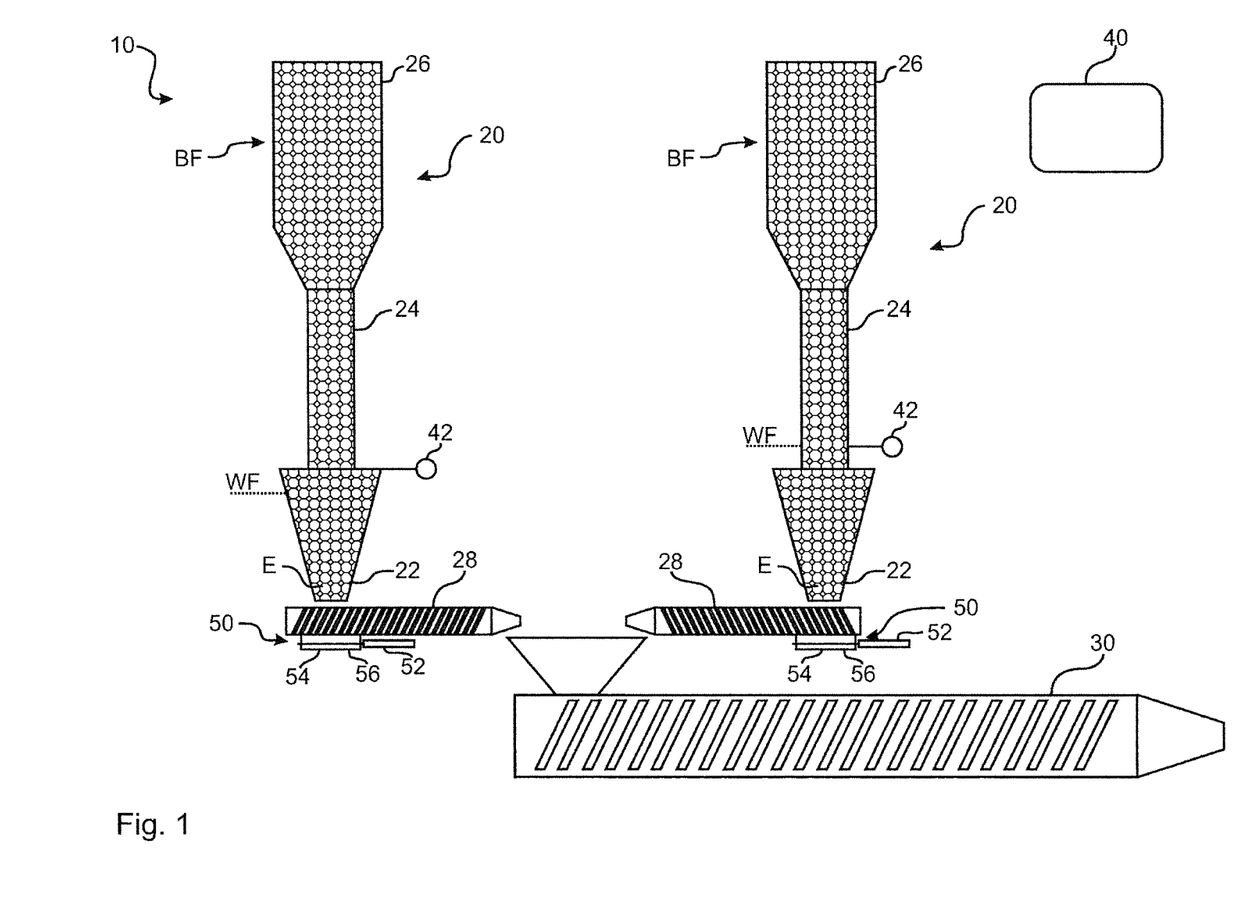
FIG. 1 schematically shows an example of an extrusion device in the operating state.
Figure 2:
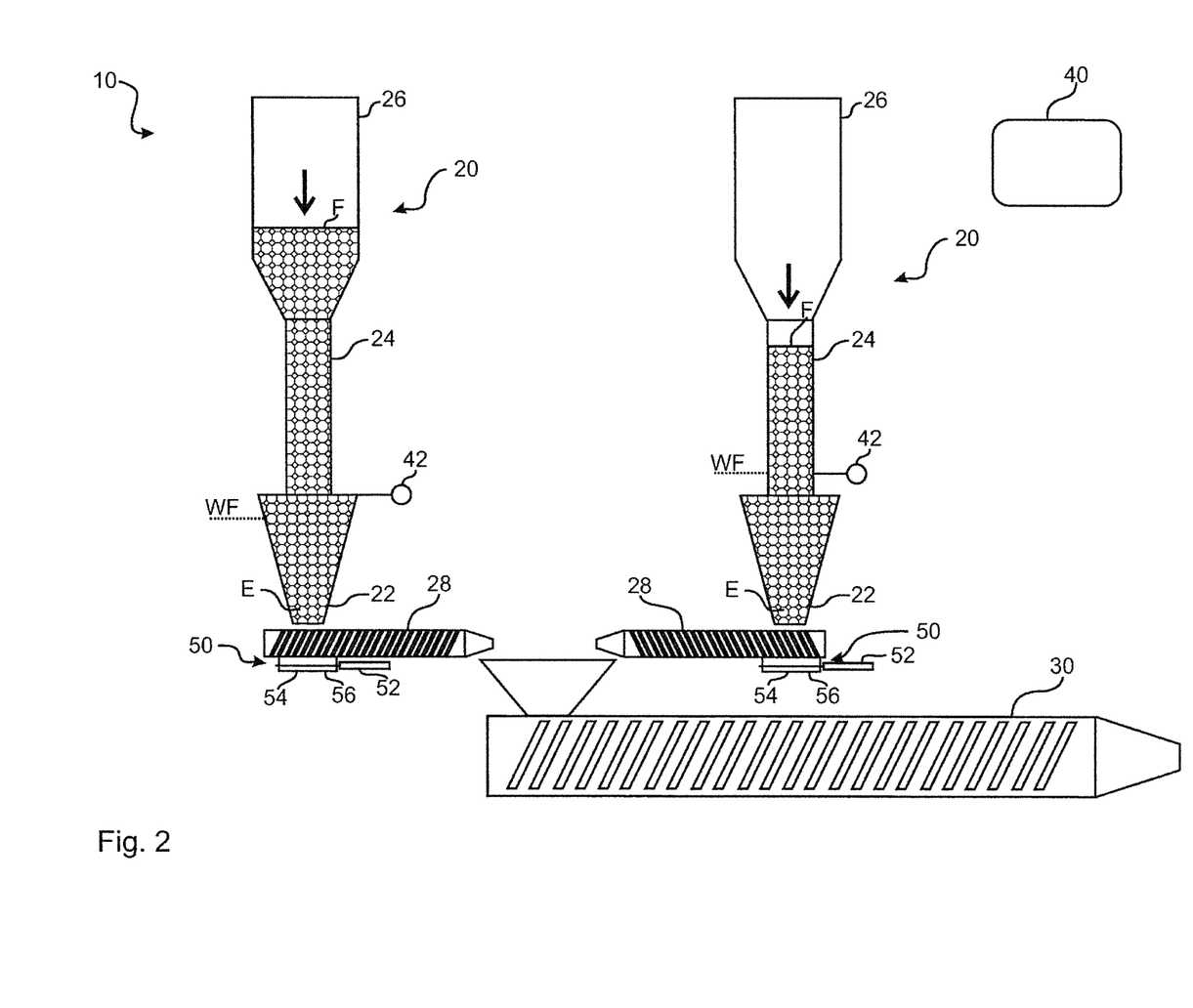
FIG. 2 schematically shows the example of FIG. 1 during lowering of the filling level.

FIG. 1 shows the operating situation in which an operating filling level BF is provided as filling level F for the feedstock E. A method of regulating the filling level and further regulating the entire extrusion device 10 can be carried out with the help of a control device 40. If provision is made to change the material, in particular a prior reduction of the filling levels F in the feed units 20 is advisable.

Figure 3:
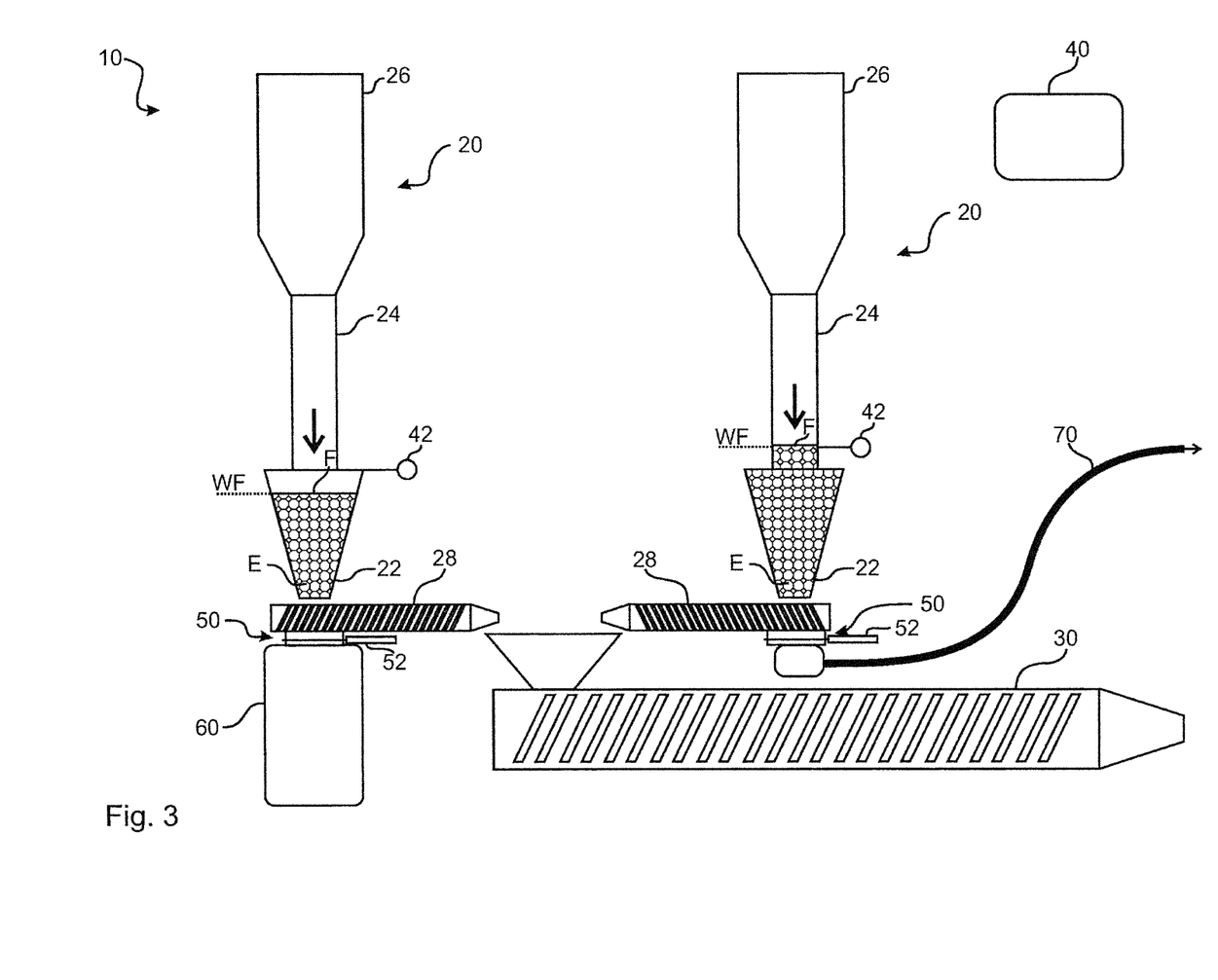
FIG. 3 schematically shows the example of FIGS. 1 and 2 when reaching the filling level at a changing filling level.
Figure 4:
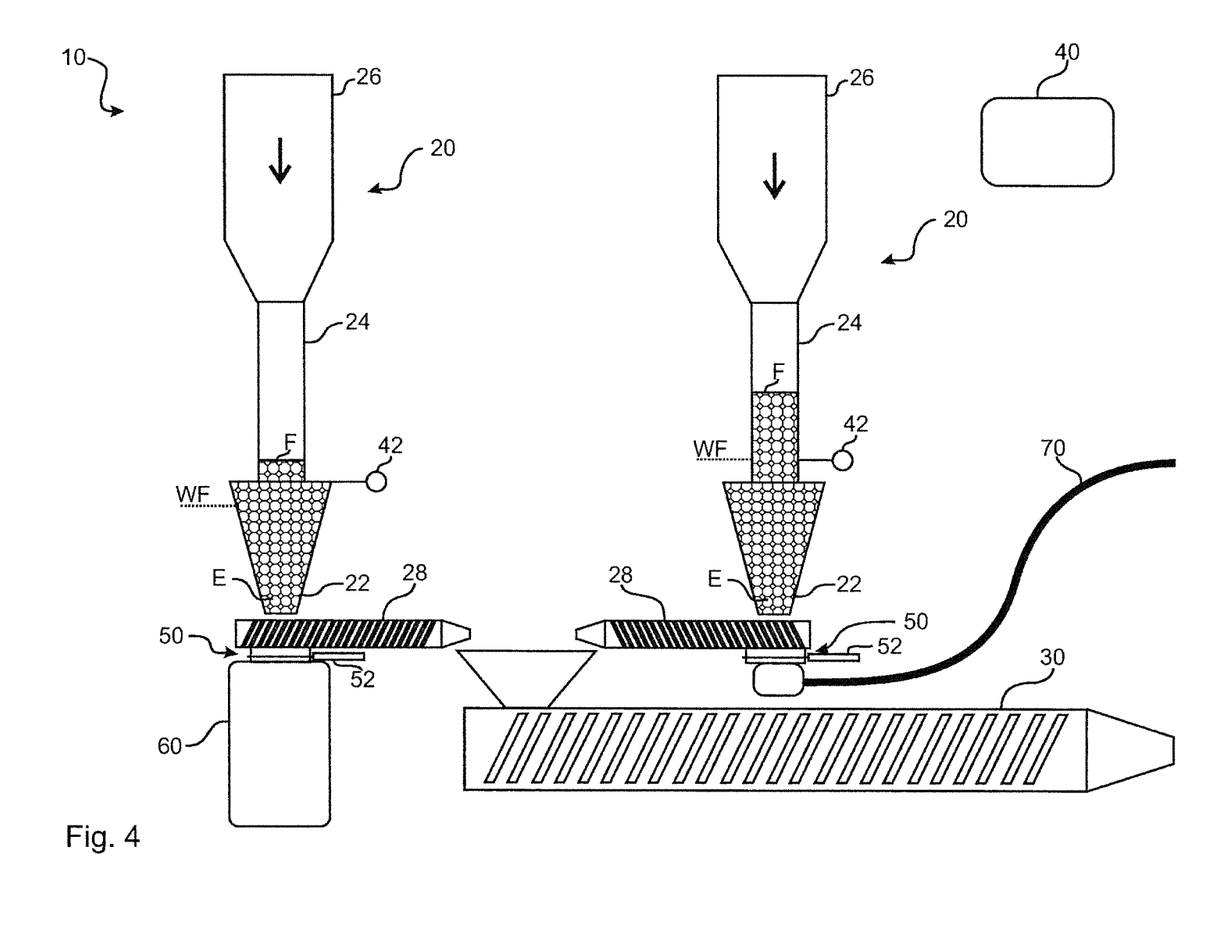
FIG. 4 schematically shows the example of FIGS. 1 to 3 while maintaining a changing filling level.
Figure 5:
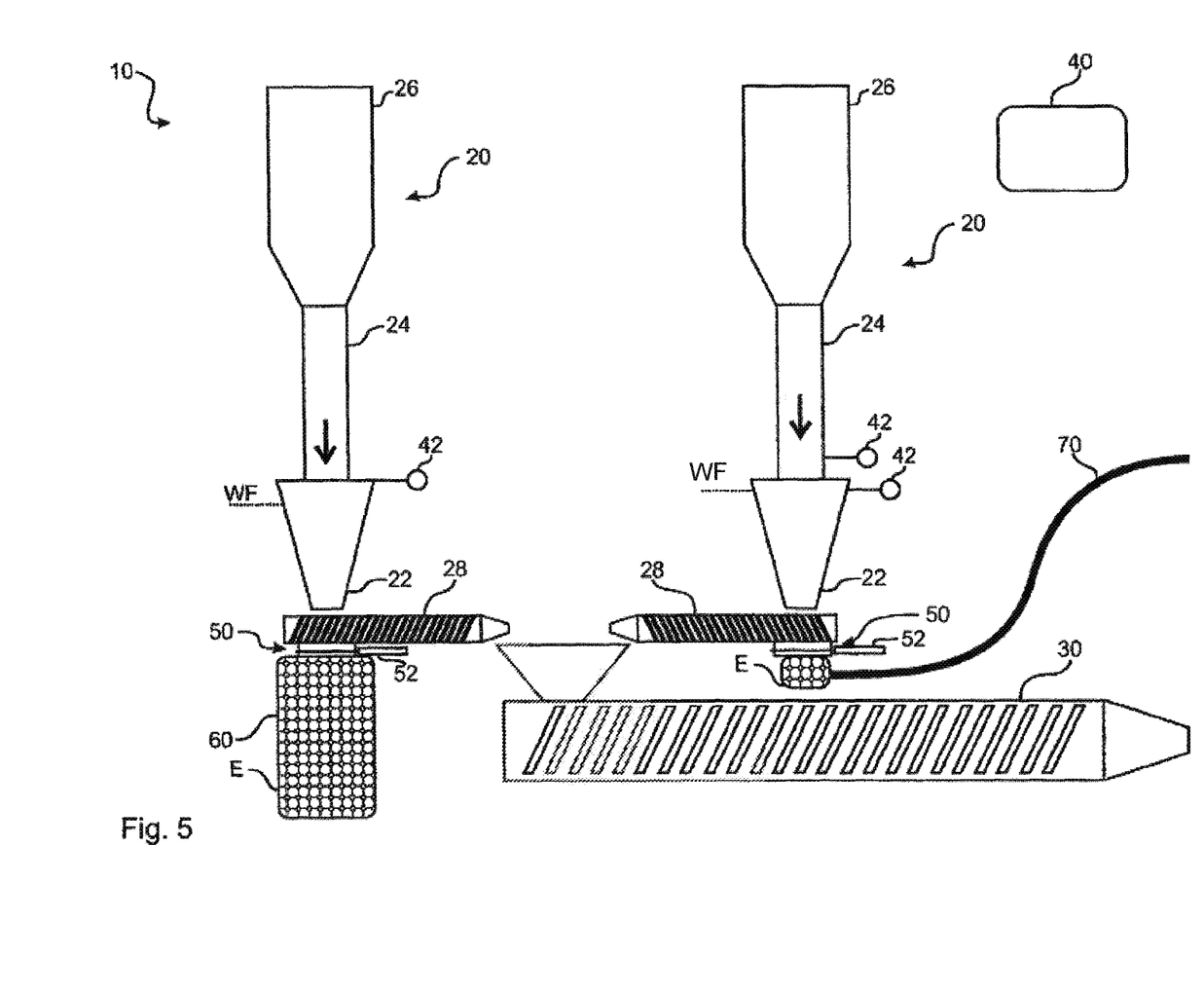
FIG. 5 schematically shows the output of the feedstock from the feed units.

If a material change is identified, the filling level F can be lowered inside the feed units 20, in particular until a changing filling level WF is reached, as is shown in FIG. 3. Filling level sensors 42 that can be direct filling level sensors or indirect filling level sensors 42 in the form of a weighing sensor on the left feed unit 20, are active during the lowering according to FIG. 2. As soon as the filling level sensor WF has been reached, maintaining at this changing filling level can be carried out, in particular by a subsequent conveying in batches as shown, for example, in FIG. 4. FIG. 5 shows how two different options of the discharge can be carried out. In the extrusion device 10, every feed unit 20 is thus equipped with a discharge opening 50 that forms the lower closure of the feed units 20. A discharge closure 52 can be opened and closed with the help of a valve mechanism, which is not shown in detail. Provision is simultaneously made at the discharge opening 50 for a container interface 54 at which a corresponding discharge container 60 and/or a corresponding return device 70 can be arranged. The arrangement is shown in FIGS. 3 and 4. The discharge process can be carried out as soon as the material is to be changed, in particular as a function of a positive occupancy query of a sensor device 56, which identifies the presence and the correctness of a discharge container 60 or of a return device 70, respectively. The feedstock E is discharged by gravity conveyance and thus fills the discharge container 60. In the right feed unit 20, a return into a corresponding storage or silo takes place in particular in a suction-assisted manner with the help of the return device 70. The feed units 20 are empty at this point in time and can be filled with a subsequent material as subsequent material, in particular after an additional cleaning step.

Figure 6:
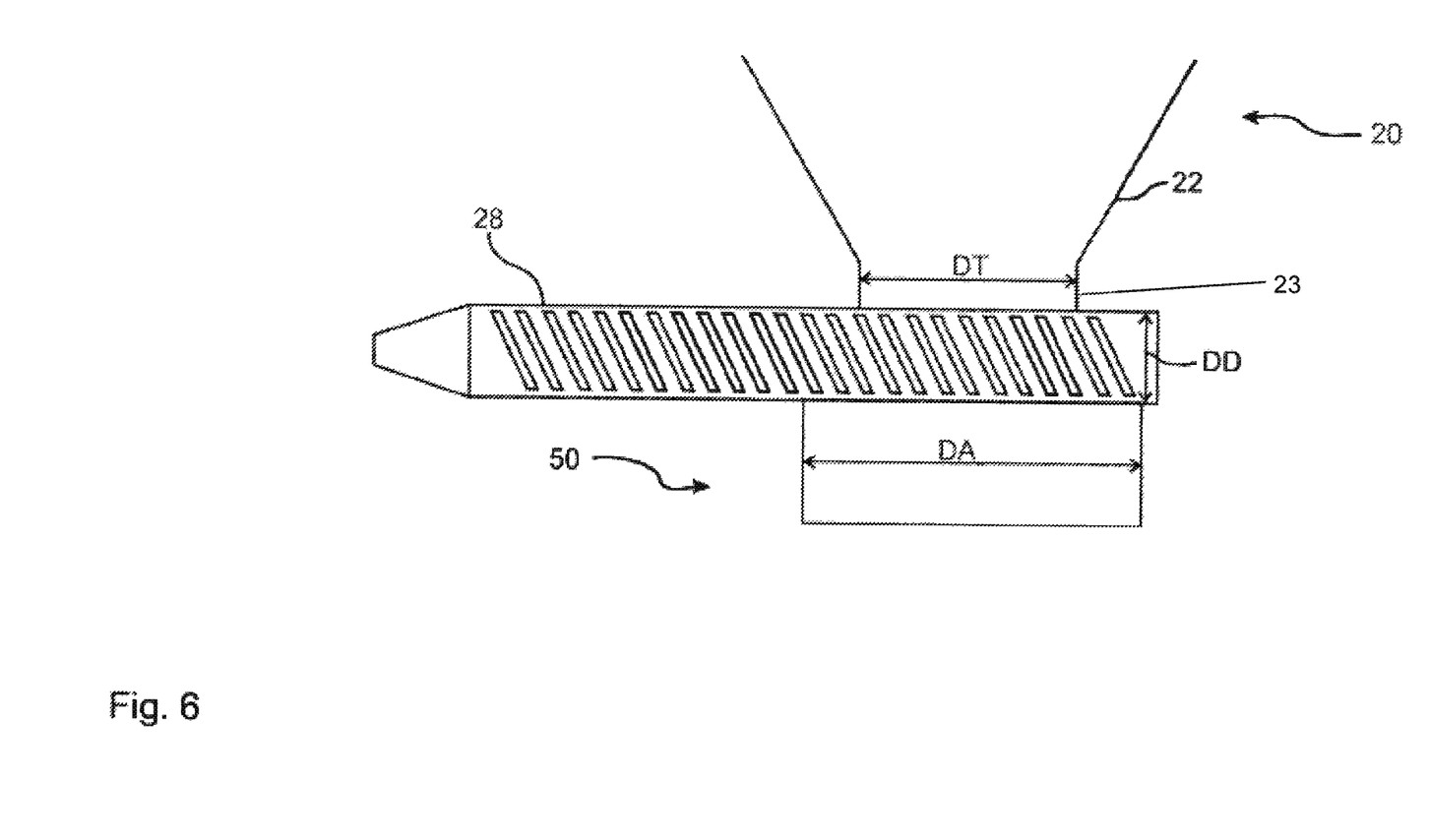
FIG. 6 schematically shows the ratios in the area of a dosing screw.

To be able to design the discharge of the feedstock E to be particularly efficient, FIG. 6 shows advantageous diameter ratios or ratios of free cross sections, respectively. It can be seen in FIG. 6 that the feed unit 20 is equipped with a weighing funnel 22 comprising a funnel opening having a free cross section DT. The discharge opening 50 is equipped with a free cross section DA and a dosing screw 28, and has a free cross section of DD. As can be seen here, ratios are formed that have the result that the free cross section DA of the discharge opening 50 is larger than the free cross section DT of the funnel opening of the weighing funnel 22 and larger than the free cross section DD of the dosing screw 28. These diameter ratios or ratios of the free cross sections, respectively, have the result that dust formation in the area of the dosing screw 28 can be avoided in a particularly simple and cost-efficient manner.

Figure 7:
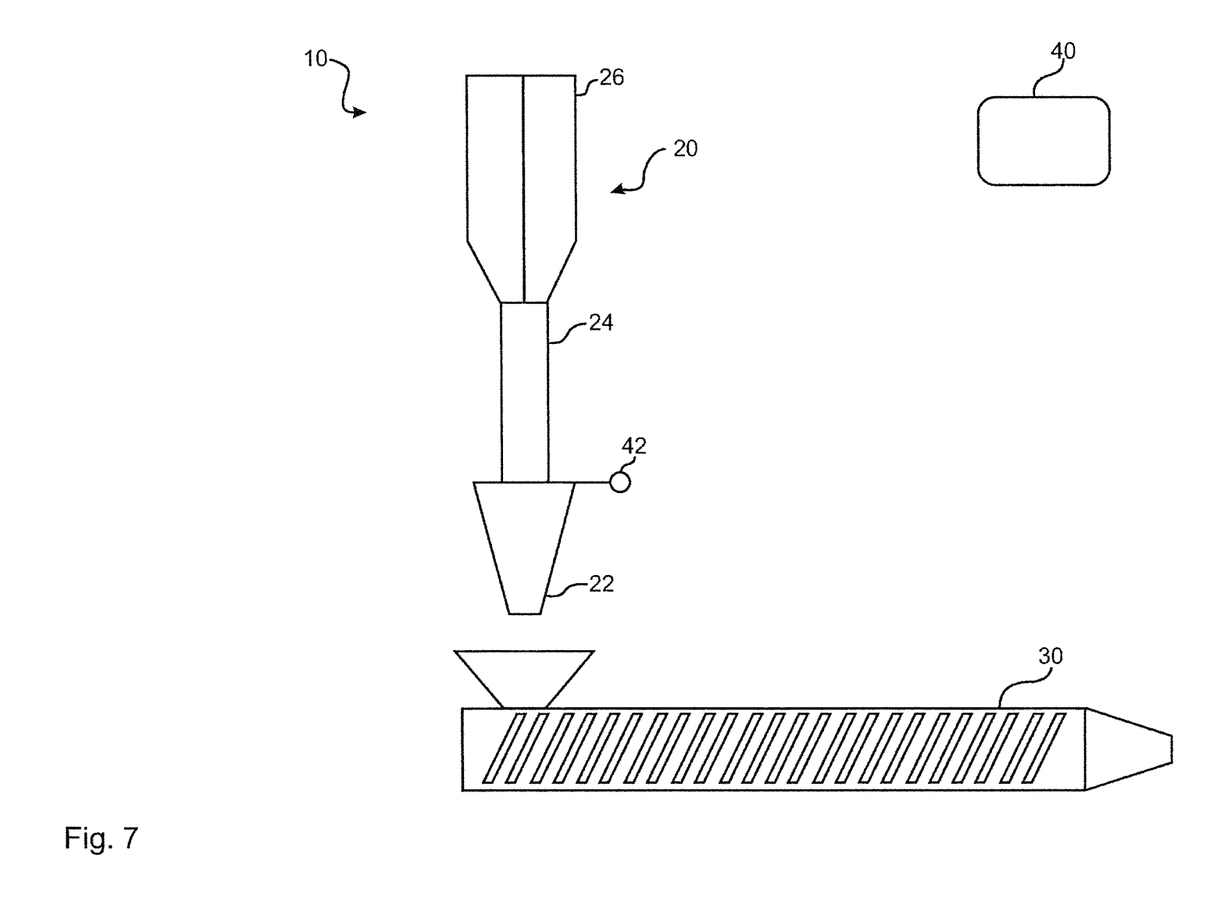
FIG. 7 schematically shows an alternative example of an extrusion device.

FIG. 7 shows an alternative example of an extrusion device 10. With regard to the advantages described above, the extrusion device is based on an example of FIG. 1, but differs in the refilling function. Provision is thus made for a so-called "batch" process for refilling. The feed container 26 is equipped with separate volumes so that each volume of the feed container 26 can be understood to be a feed unit 20. Components in the form of the down pipe 24 and the weighing funnel 22 arranged therebelow are thus common components of the different feed units 20. Provision is made below the weighing funnel 22 for a mixing funnel, in particular comprising a mixer drive that allows for homogenization prior to entering the extruder.

The above discussion of the various structures describes our devices and methods only in the context of examples. Individual features of the examples, if technically expedient, can be combined freely with one another, without departing the scope of this disclosure.

The invention claimed is:

1. An extrusion device that produces plastic film comprising at least two feed units that feed feedstock to an extruder, wherein each feed unit has at least one discharge opening comprising a discharge closure to open and close the discharge opening, and a container interface that reversibly fastens a discharge container that accommodates feedstock discharged from the respective feed unit, wherein, by the container interface, the discharge container automatically remains in a predetermined discharge position during discharge of the feedstock from the feed unit, wherein the container interface has an upper side and a lower side, and the container interface is attached at the upper side and the lower side is built to receive the discharge container from below.

2. The extrusion device according to claim 1, wherein, in addition to fastening the discharge container, the fastening interface fastens a return device that returns feedstock into a storage.

3. The extrusion device according to claim 1, wherein the discharge opening, at least the discharge closure or the container interface have a sensor device that identifies occupancy of the fastening interface.

4. The extrusion device according to claim 1, wherein the discharge opening is a gravity conveyance in response to the discharge of the feedstock.

5. The extrusion device according to claim 1, wherein the feed unit has a dosing screw, the feedstock is supplied to the dosing screw from a funnel opening of a weighing funnel, and the free cross section of the funnel opening to the free cross section of the discharge opening has a ratio of 1:1 to 0.1:1.

6. The extrusion device according to claim 1, wherein the feed unit has a dosing screw and the free flow cross section of the discharge opening is larger than or equal to the free cross section of dosing screw.

7. The extrusion device according to claim 1, wherein a discharge container comprising a discharge volume that accommodates feedstock is reversibly fastened to the container interface, which discharge volume has a ratio of 1:1.2 to 1:5 with a changing filling level in the feed unit.

8. The extrusion device according to claim 1, wherein at least the discharge opening or the discharge closure is adjustable with regard to the discharge speed.

9. A method of discharging a feedstock from the feed units of the extrusion device of claim 1, comprising:
   identifying a changing request for the discharge of the feedstock,
   fastening a discharge container to the fastening interface of the discharge opening of a feed unit,
      opening the discharge closure of the discharge opening with the fastened discharge container, and
      repeating the two above steps for at least one further feed unit.

10. An extrusion device for producing a plastic film, having at least two feed units for feeding feedstock to an extruder, wherein each feed unit has at least one discharge opening comprising a discharge closure for opening and closing the discharge opening, and a container interface for reversibly fastening a discharge container for accommodating feedstock, which is discharged from the respective feed unit, wherein by the container interface the discharge container automatically remains in the desired discharge position during the discharge of the feedstock from the feed unit, and the discharge opening, at least the discharge closure or the container interface have a sensor device for identifying an occupancy of the container interface so that the discharge process is carried out at every feed unit at which a discharge container is already arranged.

\* \* \* \* \*